United States Patent
Dams et al.

(10) Patent No.: US 6,353,186 B1
(45) Date of Patent: Mar. 5, 2002

(54) SEAL HAVING A SEALING MEMBER BETWEEN SUPPORT MEMBERS WITH PERIPHERAL CHANNELS FOR RECEIVING ELONGATE ARTICLES

(75) Inventors: Francis Dams, Kessel-Lo; Jan Dericjk, St Pieters Rode; Dirk Roosen, Tienen; Filip Vandeputte, Linden, all of (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 09/720,501

(22) PCT Filed: Jun. 15, 1999

(86) PCT No.: PCT/GB99/01898

§ 371 Date: Dec. 27, 2000

§ 102(e) Date: Dec. 27, 2000

(87) PCT Pub. No.: WO00/02295

PCT Pub. Date: Jan. 13, 2000

(30) Foreign Application Priority Data

Jul. 3, 1998 (GB) ............................................. 9814399

(51) Int. Cl.$^7$ ................................................. H02G 3/18
(52) U.S. Cl. .................. 174/65 G; 174/65 R; 174/135; 16/2.1; 248/56
(58) Field of Search ........................... 174/65 G, 65 SS, 174/65 R, 152 G, 153 G, 151, 135, 77 R; 16/2.1, 2.2; 248/56; 29/868; 439/604, 587, 274, 275

(56) References Cited

U.S. PATENT DOCUMENTS 3,197,830 A * 8/1965 Hoadley .................. 24/16 PB
4,267,401 A    5/1981 Wilkinson ................... 174/77
4,607,469 A * 8/1986 Harrison ............... 174/77 R X
6,150,608 A * 11/2000 Wambeke et al. ........ 174/65 G
6,180,882 B1 * 1/2001 Dinh ....................... 174/65 SS

FOREIGN PATENT DOCUMENTS

| EP | 0278544 | * | 8/1988 | ............... 174/65 G |
| EP | 0 538 008 A2 | | 4/1993 | |
| WO | 96/09670 | * | 3/1996 | |
| WO | WO 97/42693 | | 11/1997 | |

OTHER PUBLICATIONS

Copy of International Search Report.
Copy of International Preliminary Examination Report.

* cited by examiner

Primary Examiner—Dean A. Reichard
Assistant Examiner—Dhiru R Patel
(74) Attorney, Agent, or Firm—Myers Bigel Sibley & Sajovec

(57) ABSTRACT

A seal is provided for sealing an aperture in an object through which aperture one or more elongate articles extends. The seal includes a first support member having at least one longitudinally extending channel adapted to accommodate and support an elongate article. A second support member is longitudinally spaced from the first support member. The second support member has at least one longitudinally extending channel corresponding to that of the first support member and a sealing member is positioned between the first and second support members. An elongate article may thus be accommodated within the longitudinal extending channel of the first support member so as to extend through the corresponding channel on the second support member while deforming sealing member.

19 Claims, 4 Drawing Sheets

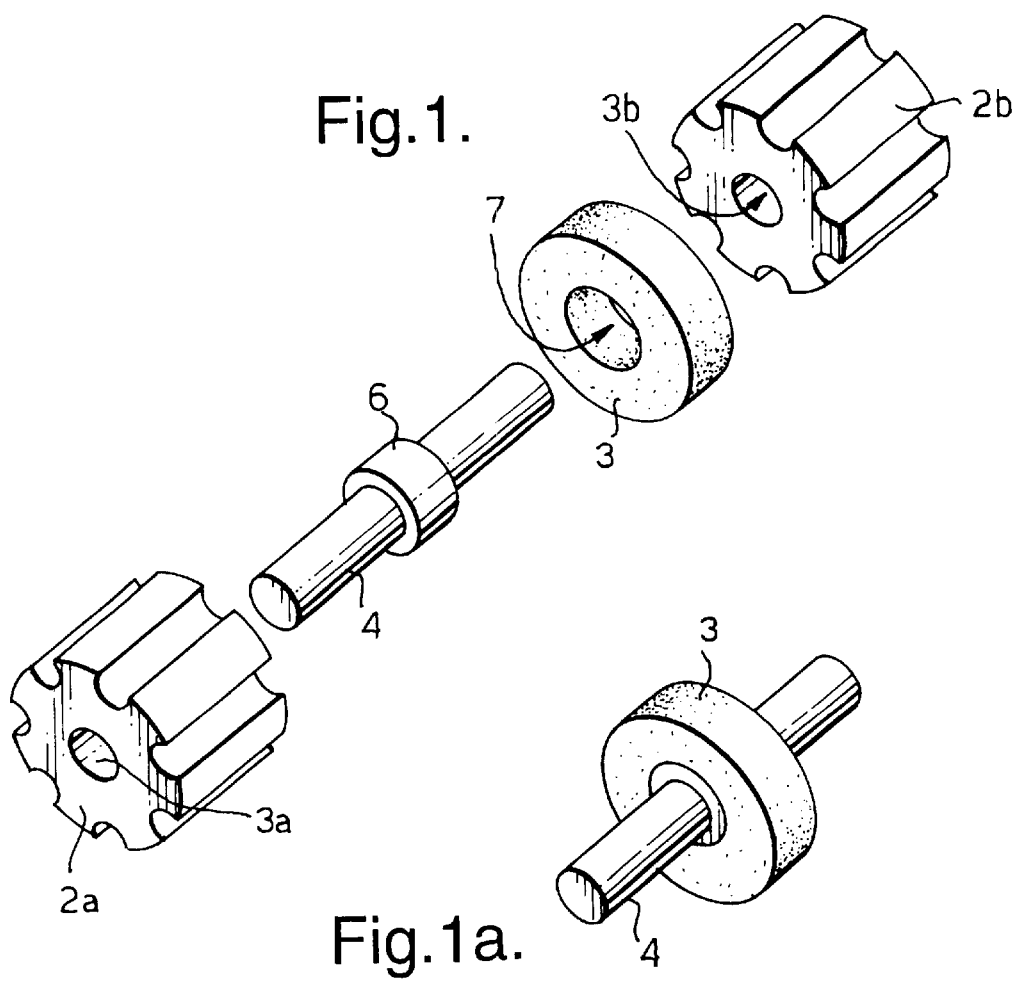
Fig.1.
Fig.1a.
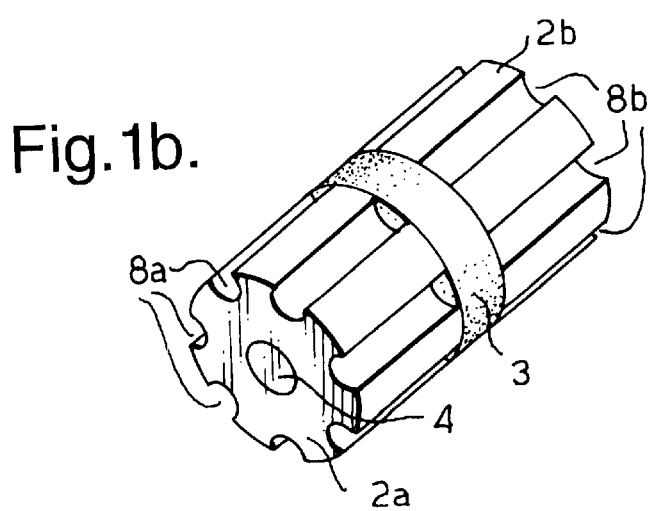
Fig.1b.

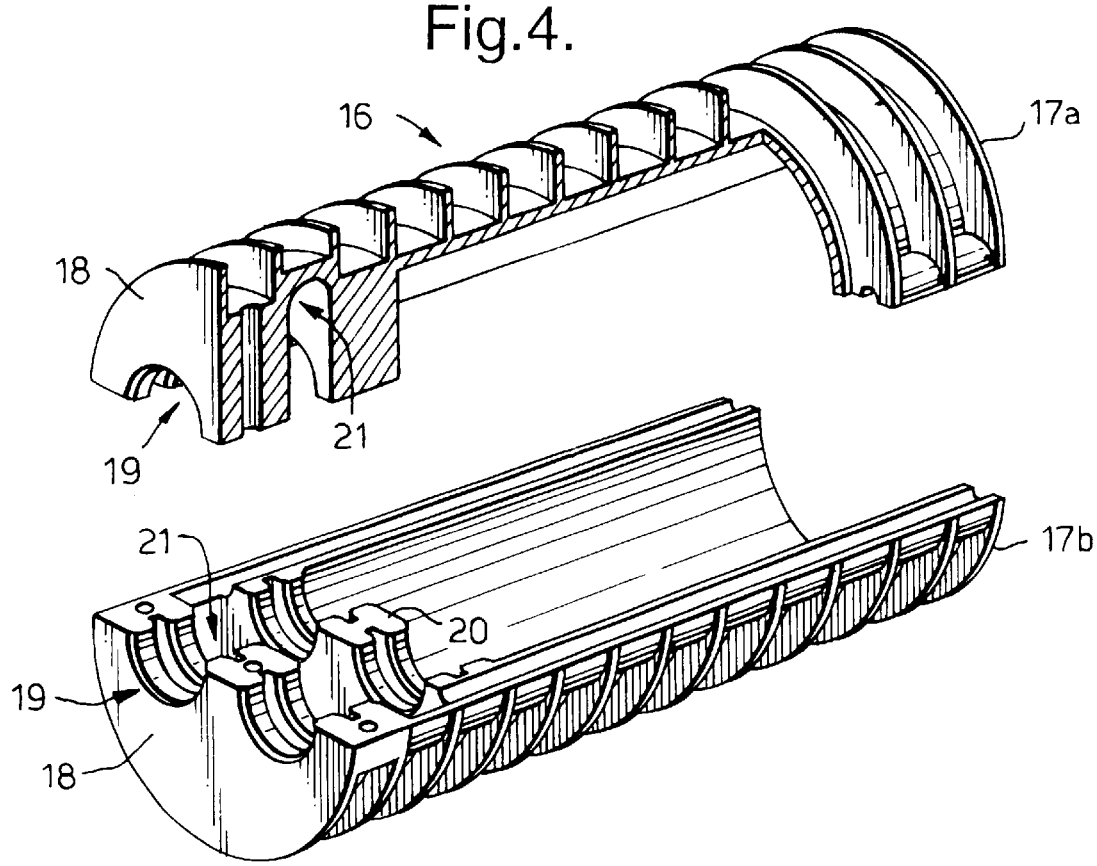

SEAL HAVING A SEALING MEMBER BETWEEN SUPPORT MEMBERS WITH PERIPHERAL CHANNELS FOR RECEIVING ELONGATE ARTICLES

RELATED APPLICATIONS

The present application is a National Phase application of PCT/GB99/01898 filed on Jun. 15, 1999 and published in English which claims priority from Application GB 9814399.3 filed on Jul. 3, 1998.

FIELD OF THE INVENTION

The present invention relates generally to a seal, and more specifically to a seal for sealing an aperture in an object through which one or more elongate article extends and to objects including such a seal.

The present invention finds particular utility as a seal for protecting junctions between elongate articles such as pipes, tubes or cables. The term "cable" Will be understood hereinafter to include both conductive cables and bundles of optical fibres. When it is necessary to make connections between elongate articles such as pipes, tubes or cables the junction or splice where such article are joined end-to-end is necessarily less strong and less resistive to environmental agents liable to cause deterioration over time than the article itself.

BACKGROUND OF THE INVENTION

In the production of, for example, cable systems such as telecommunication or power transmission systems, it is frequently necessary to make splices either to join cables end-to-end or to make a branch. The cables and the splices may be located underground, in conduits or in other environments, inside or outside buildings, but in any event are always at risk to the ingress of environmental agents such as moisture or dust. Underground installations are also subject to pressure, and in particular hydrostatic pressure, whilst above-ground installations suffer from diurnal thermal variations. In order to provide environmental protection for splices in cables or other elongate articles various protective measures are known. Systems utilising an enclosing casing have been found to be particularly valuable. Such casings or enclosed containers have a housing for enclosing the cable connections or splices and at least one aperture in the housing wall through which the cable or cables can extend. To ensure adequate protection a seal should be provided for any such aperture.

There is a need for a seal for sealing an aperture in an object which has a simple construction, is easy to install and provides a good sealing performance.

SUMMARY OF THE INVENTION

According to a first aspect of the present invention there is provided a seal for sealing an aperture in an object through which aperture one or more elongate articles extends, which seal comprises:
  a first support member having at least one longitudinally extending channel adapted to accommodate and support an elongate article;
  a second support member in use longitudinally displaced from the first support member, the second support member having at least one longitudinally extending channel corresponding to that of the first support member; and
  a sealing member situated between the first and second support members, the arrangement being such that to accommodate an elongate article within the longitudinal extending channel of the first support member so as to extend through the corresponding channel on the second support member it is necessary for the sealing member to be deformed from its rest configuration.

The present invention not only provides a good seal but also performs the function of gripping the elongate article with respect to the aperture. The deformation of the sealing member by the elongate articles causes the sealing member to seal between and around those articles.

The first and second support members are preferably substantially identical to one another. They may be an integral component, in which case they are joined together by a connecting member. Alternatively the first and second support members may be separate components, which may be optionally joined together by a connecting member which may be integral with one of them.

Each or both of the support members preferably takes the form of a substantially cylindrical body having the said at least one longitudinally extending channel in its periphery. It is preferred that each support member be provided with a plurality of longitudinally extending channels. The channels are open to and extend from the outer periphery of the support member and may take any desired shape or form so as to accommodate the elongate article with which the seal is to be used. They may, for example, be substantially U or V shaped channels. For the accommodation of any connecting member the or each support member may be provided with a longitudinally extending hole, preferably central of the support member and parallel to its longitudinal axis.

The or each support member may be formed from any suitable material and may be elastomeric or rigid in nature. The or each support member may, for example, be formed of a metal, such as aluminium or steel, a naturally occurring elastomeric material such as rubber, or a plastics material, e.g. a polyamide, polycarbonate or polyolefin such as polyethylene or polypropylene.

The sealing member preferably takes the form of a substantially cylindrical block of sealant material. The dimensions of the sealant material block, in particular its cross sectional width, should be at least as great as the corresponding dimension of the first and second support member. The outer dimensions of the sealant material block should, in particular, be greater than the inner dimensions of the longitudinally extending channels so that an elongate article lying in those channels needs to deform the sealant material in order for the elongate article not to be laterally deflected but to lie in a straight line.

The sealing member may generally comprise any suitable sealant. A particular preferred sealant material is a gel sealant. The gel sealant may be any suitable gel or geloid sealant such as silicon, urea or urethane gel. It may take the form of a liquid, extended polymer composition gel sealant, with the polymer comprising an elastomer, or a block copolymer have relatively hard blocks and relatively elastomeric blocks. Examples of such copolymers include styrene-diene block copolymers or styrene-ethylene-propylene-styrene block copolymers. The extender liquids employed in the gel preferably comprise oils, such as naturally occurring hydrocarbon oils, synthetic oils or mixtures thereof. Preferred oils are mixtures of non-aromatic paraffins and naphthenic hydrocarbon oils. Such gels are well known in the prior art.

Any connector member when present may take any suitable form. It may, for example, take the form of a rod formed from any of the materials described above in relation to the first and second support members.

To assist in the support of the elongate articles within the longitudinally extending channels of the first and second support members, additional retaining means may be provided. Such means may take the form of tie wraps and/or tapes or strips. Cable gripping strips could, for example, be wound around the elongate articles either individually or in groups. Such a gripping strip, called an axial pull strip, is disclosed in WO96/09670, which document is incorporated herein by reference. Such strips increase the ability of elongate articles, such as cables, to withstand axial forces and where necessary increase the dimensions of the elongate articles to match the sizes of apertures in the casing.

Additional sealant material may be placed around the elongate articles and the central sealant material if required. Such further sealant material could be used in the form of a tape.

The seal of the present invention has a wide application for the sealing of objects having an aperture. It may, for example, be used as a duct seal, a grommet or "feed through" in a wall, or the bulkhead of a car or other vehicle. More preferably it may be used for the sealing of an aperture in a closed container for containing optical fibre or electrical splices or connections. Such a container may be supplied with seals according to the first aspect of the present invention pre-installed or the seals may be applied separately and installed when used. The seal is particularly suitable for sealing around several small diameter cables in a cable aperture of a cable splice closure.

According to a second aspect of the present invention is provided a closed container for containing one or more cable splices or connections including a seal according to the first aspect of the present invention.

The container of the second invention may be a cable splice closure such as that described in WO97/45904 which document is incorporated herein by reference. Such a container or cable splice closure contains a housing having at least two parts or half-shells which may be joined together or formed as separate components which are brought together to provide an enclosed container. In addition to the seal of the present invention a sealing material which seals the gap between the cable and housing as it passes through the enclosed container may also be provided. Such sealing material is preferably such that it comes under pressure in use, e.g. by closing the separate parts of the housing or by other means, e.g. by the provision of movable parts of the container. The container, and in particular its housing, may be formed from any suitable material such as those described above for the first and second support member.

The terms longitudinal and lateral refer in general to a direction substantially parallel and substantially perpendicular respectively to the direction in which the elongate article extends.

The present invention is advantageous over known sealing devices and is simpler to use, easier to manufacture and install and yet provides excellent mechanical and environmental protection at the same time as providing effective protection against forces, in particular axial (longitudinal) forces. The strain relief provided with the present invention is easier to achieve than prior art conventional methods requiring the individual wrapping of cables with tape, which is more time consuming as the number of individual cables increases. The present invention also ensures that the cables remain separate, i.e. spaced from, each other to allow the sealing pressure of the sealant material to be well transferred between the cables.

For a better understanding of the present invention and to show how the same may be put into effect reference will now be made, for the purposes of illustration only, to the accompanying drawings in which:

FIG. 1 is an exploded perspective view of a first embodiment of a seal according to the present invention;

FIG. 1a and FIG. 1b show perspective views of the embodiment of FIG. 1 with some of the components assembled;

FIG. 4 shows a container according to the second aspect of the present invention for use with the seal shown in FIGS. 1 and 2 or 3.

DETAILED DESCRIPTION OF THE ILLUSTRATED EMBODIMENTS

Figure 2A:
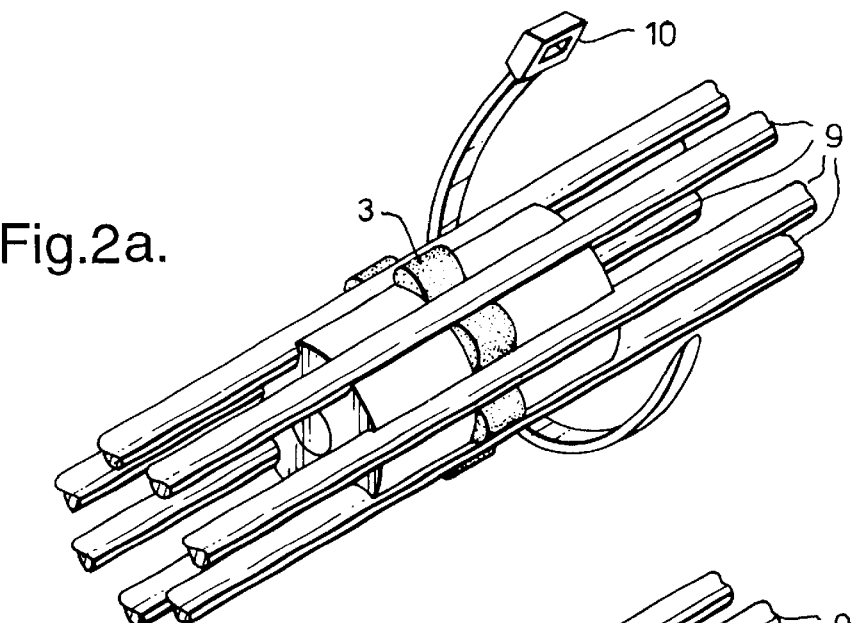
FIGS. 2a to 2d is a series of perspective views showing several stages in the assembly of the embodiment shown in FIG. 1 in use.

The seal 1 shown in FIG. 1 comprises two support members 2a, 2b formed from an elastomeric material such as rubber or a rigid material such as polypropylene. The two support members 2a, 2b, are laterally displaced from each other and sandwiched between them is a block of sealant material 3. Interconnecting the two support members 2a, 2b is an interconnecting rod 4 of polypropylene. The interconnecting rod is a circular cylindrical rod which passes through circular cylindrical bore holes 3a, 3b provided in the support members 2a, 2b. The interconnecting rod 4 is provided with a portion of increased diameter 6 which supports the sealant material block 3 by engaging in an axial bore hole 7 as shown in FIG. 1a.

Each of the support members 2a, 2b is provided with a plurality of longitudinally extending channels 8a, 8b radially arranged around their cylindrical periphery.

As shown in FIG. 2a, elongate articles such as fibre optic cables 9 can be accommodated within the longitudinally extending channels 8a, 8b so as to lie substantially parallel to one another. The dimensions of the sealant material block 3 is such that in order to accommodate the cables 9 within the corresponding channels 8a, 8b the sealant material must be squashed by the cables and in doing so is pushed out around at least part of the cables so as to seal between them.

Figure 2B:
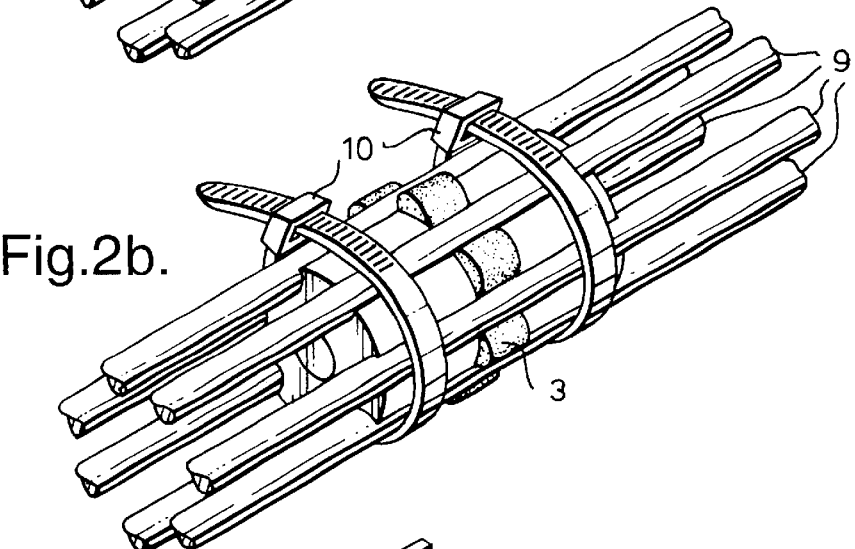
Figure 2C:
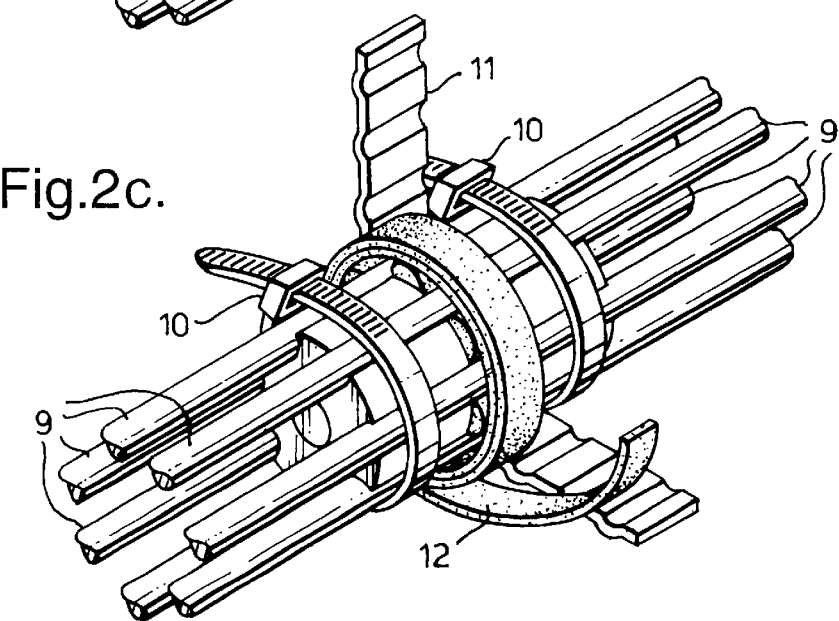
Figure 2D:
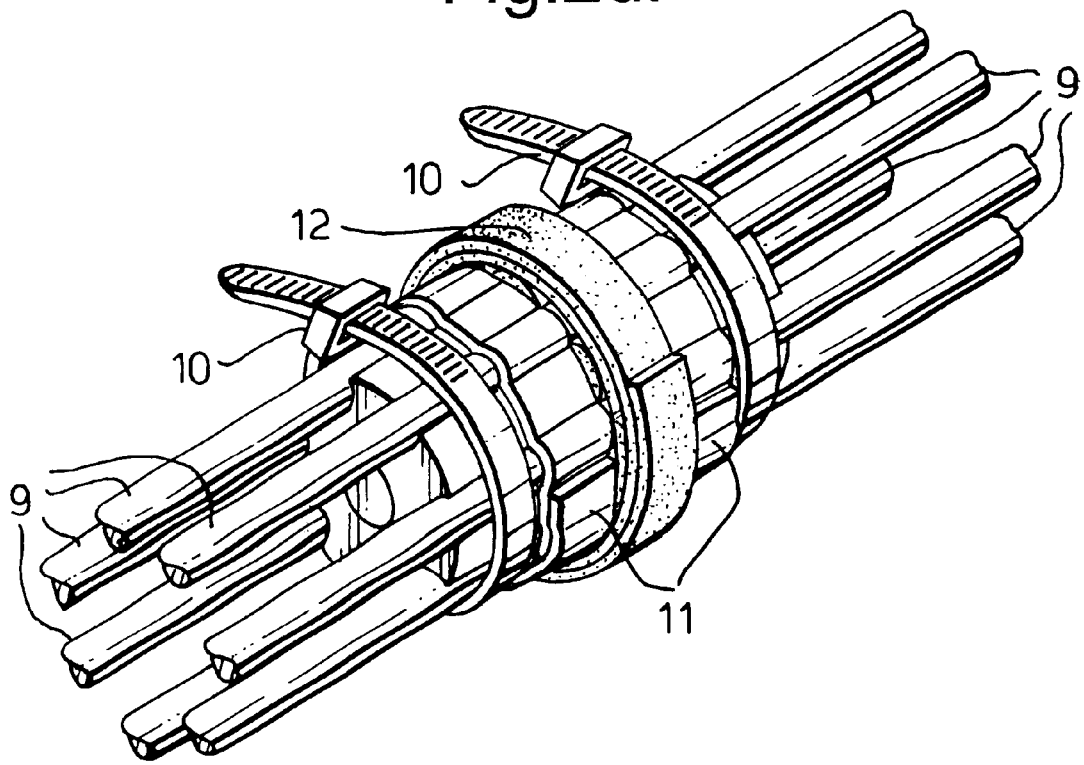

As additional securing means tie wraps 10 may be wrapped around the cables positioned on the seal 1 as shown in FIG. 2b. to provide added strength against axial forces an axial pull strip 11 may also be wrapped around the bundles of cables positioned on the seal as shown in FIG. 2c. In order for large diameter apertures or ports to be accommodated additional sealing material such as a gel tape 12 may be wrapped around the deformed sealant material block 3.

Figure 3:
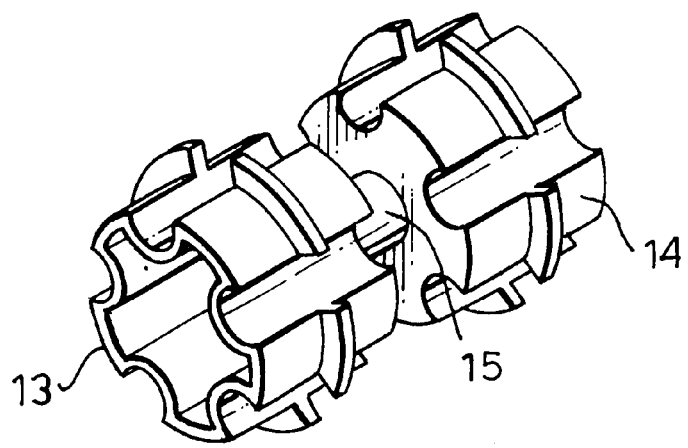
FIG. 3 is a perspective view of a second embodiment of the present invention.

In the second embodiment shown in FIG. 3, rather than the first and second support members being separate components interconnected by a separate interconnecting rod, the first 13 and second 14 support members are formed as an integral component with an integral interconnecting rod 15 extending therebetween. Such an integral component is advantageously formed from a rigid material such as polypropylene.

The seal of the present invention, including the first and second embodiments described above are of use as a cable seal for sealing around several small diameter cables in a cable aperture of a cable splice closure. Such a cable splice closure 16 is shown in FIG. 4. The closure 16 is formed from two separate housing parts 17a, 17b which fit together to form an enclosed container. The end 18 of the closure has cable apertures 19, which are formed by the fitting together of the two housings parts 17a, 17b. which are provided with U shaped cut outs in the end wall 18. A longitudinally spaced wall 20 defines with the end wall 18 a cavity 21. The seal will fit in to one of the cable apertures 19 such that the central sealant material block 3 is accommodated within the cavity 15 and the support members 2a, 2b or 13, 14, and axial pull strip 11 where present, interlock with the profiled internal surfaces of the walls 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A seal for sealing an aperture in an object which aperture is configured to receive at least one elongate article, which seal comprises:
   a first support member having in its periphery a plurality of channels adapted to accommodate an elongate article;
   a second support member longitudinally spaced from the first support member, the second support member having in its periphery a plurality of channels corresponding to those of the first support member;
   a sealing member situated between the first and second support members;
   a connecting member for connecting the first support member, the second support member and the sealing member;
   wherein the support members comprise a substantially cylindrical body, said plurality of channels of the support members extending longitudinally for a length greater than their width so as to support the at least one elongate article over part of its length; and
   wherein the sealing member has an outer dimension which is greater than the inner dimensions of the longitudinally extending channels of at least one of the support members so that the at least one elongate article accommodated in the longitudinally extending channels of the support members deforms the outer dimension of the sealing member.

2. A seal according to claim 1, wherein the sealing member comprises gel sealant.

3. A seal according to claim 1, wherein the connecting member is integral with the first support member.

4. A seal according to claim 3, wherein the connecting member is formed from a rigid material.

5. A seal according to claim 1, wherein the connecting member is integral with the second support member.

6. A seal according to claim 1, further comprising at least one tie wrap positioned around the periphery of at least one of the support members for positioning the at least one elongate article.

7. A seal according to claim 1, further comprising at least one axial pull strip positioned around the periphery of at least one of the support members for providing axial pull relief.

8. A seal according to claim 1, further comprising at least one gel tape for sealing around the sealing member.

9. A seal for sealing an aperture in an object which aperture is configured to receive at least one elongate article, which seal comprises:
   a first support member having in its periphery a plurality of channels adapted to accommodate an elongate article;
   a second support member longitudinally spaced from the first support member, the second support member having in its periphery a plurality of channels corresponding to those of the first support member;
   a sealing member situated between the first and second support members;
   a connecting member for connecting the first support member, the second support member and the sealing member;
   wherein the support members comprise a substantially cylindrical body, said plurality of channels of the support members extending longitudinally so as to support the at least one elongate article over part of its length;
   wherein the sealing member has outer dimensions which are greater than the inner dimensions of the longitudinally extending channels of at least one of the support members so that the at least one elongate article accommodated in the longitudinally extending channels of the support members needs to deform the sealing member; and
   wherein the connecting member is provided with a portion of increased diameter for supporting the sealing member.

10. A seal for sealing an aperture in an object, the seal comprising:
    a first substantially cylindrical support member including a plurality of longitudinally extending channels in a peripheral surface of the first support member;
    a connecting member connected to and extending longitudinally from the first support member;
    a second substantially cylindrical support member connected to the connecting member at a position longitudinally spaced from the first support member, the second support member including a plurality of longitudinally extending channels in a peripheral surface of the second support member at radial positions corresponding to ones of the plurality of channels of the first support member, the longitudinally extending channels of the support members extending for a length greater than their width; and,
    a seal member positioned between the first and second support members, the seal member having an outer dimension greater than an inner dimension of the longitudinally extending channels of at least one of the support members; and
    wherein the seal member is positioned between the first and second support members so that an elongate article seated in one of the plurality of channels of the first and second support members and extending therebetween across the seal member deforms the outer dimension of the seal member.

11. A seal according to claim 10, wherein the seal member comprises gel sealant.

12. A seal according to claim 10, wherein the connecting member is integrally formed with at least one of the first support member and the second support member.

13. A seal according to claim 12, wherein the connecting member comprises polypropylene.

14. A seal according to claim 10, further comprising at least one tie wrap around at least one of the support members that seats the elongate article in one of the plurality of channels of the at least one of the support members.

15. A seal according to claim 10, further comprising at least one axial pull strip around at least one of the support members.

16. A seal according to claim 10, further comprising at least one gel tape wrapped around the sealing member.

17. A seal for sealing an aperture in an object, the seal comprising:
   a first substantially cylindrical support member including a plurality of longitudinally extending channels in a peripheral surface of the first support member;
   a connecting member connected to and extending longitudinally from the first support member;
   a second substantially cylindrical support member connected to the connecting member at a position longitudinally spaced from the first support member, the second support member including a plurality of longitudinally extending channels in a peripheral surface of the second support member at radial positions corresponding to ones of the plurality of channels of the first support member; and,
   a seal member positioned between the first and second support members, the seal member having an outer dimension greater than an inner dimension of the longitudinally extending channels of at least one of the support members;
   wherein the seal member is positioned between the first and second support members so that an elongate article seated in one of the plurality of channels of the first and second support members and extending therebetween across the seal member deforms the seal member; and
   wherein the connecting member further comprises end portions connected to respective ones of the support members and a medial portion therebetween having a diameter greater than the end portions that supports the seal member.

18. A cable splice closure comprising:
   a first housing part;
   a second housing part configured to mate with the first housing part to define an enclosed container; and
   an aperture in an end of the enclosed container including a seal, the seal comprising:
      a first substantially cylindrical support member including a plurality of longitudinally extending channels in a peripheral surface of the first support member;
      a connecting member connected to and extending longitudinally from the first support member;
      a second substantially cylindrical support member connected to the connecting member at a position longitudinally spaced from the first support member, the second support member including a plurality of longitudinally extending channels in a peripheral surface of the second support member at radial positions corresponding to ones of the plurality of channels of the first support member; and,
      a seal member positioned between the first and second support members, the seal member having an outer dimension greater than an inner dimension of the longitudinally extending channels; and
      wherein the seal member is positioned between the first and second support members so that an elongate article passing into the enclosed container through the seal and seated in one of the plurality of channels of the first and second support members and extending therebetween across the seal member deforms the seal member.

19. A closure according to claim 18 wherein the elongate article passing into the enclosed container through the seal and seated in one of the plurality of channels of the first and second support members and extending therebetween across the seal member deforms the outer dimension of the seal member.

* * * * *